Figure 1:
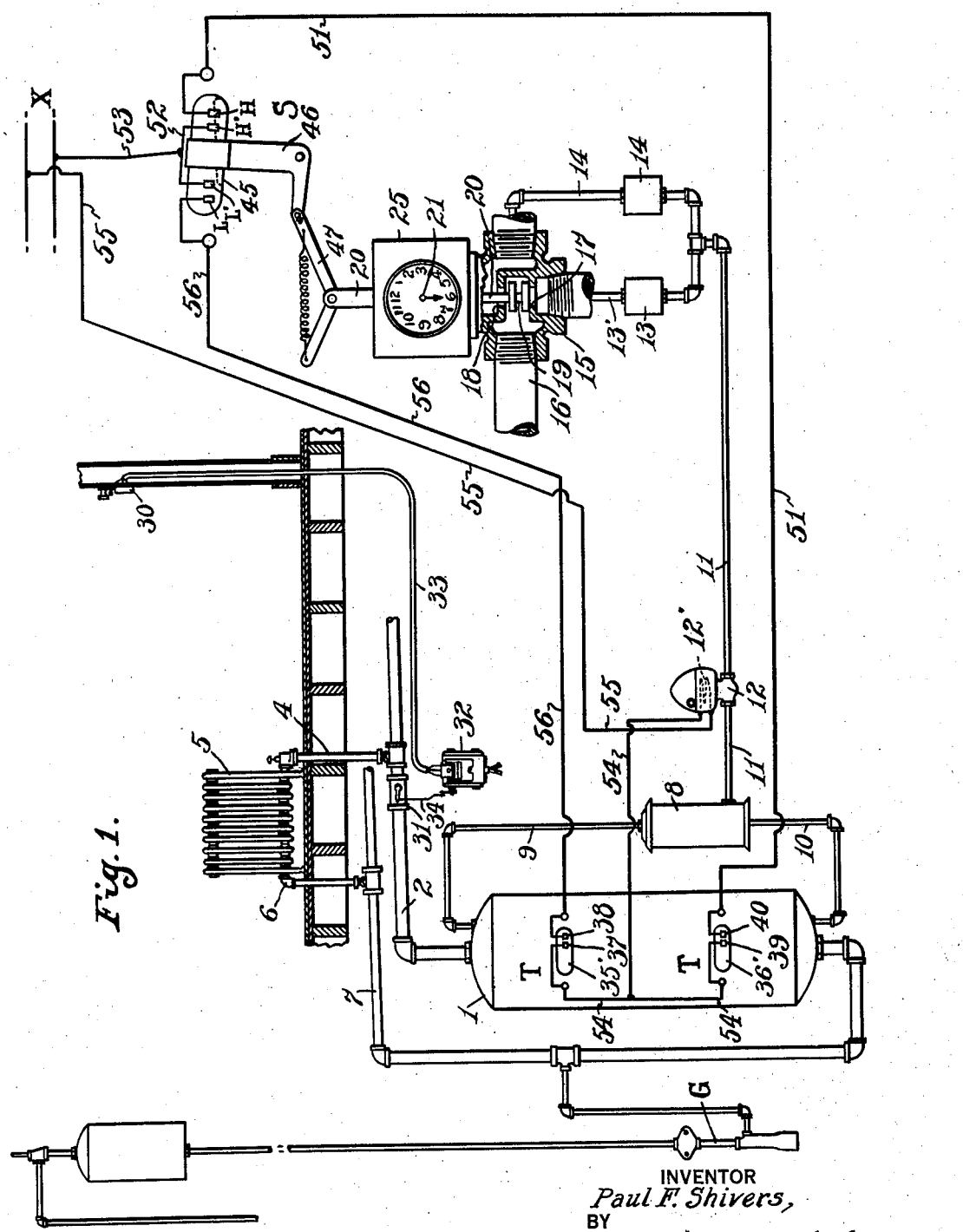

Dec. 18, 1934.     P. F. SHIVERS     1,985,215
APPARATUS FOR HEATING FLUID
Filed March 31, 1930     2 Sheets-Sheet 1

INVENTOR
Paul F. Shivers,
BY
Hood + Hahn.
ATTORNEYS

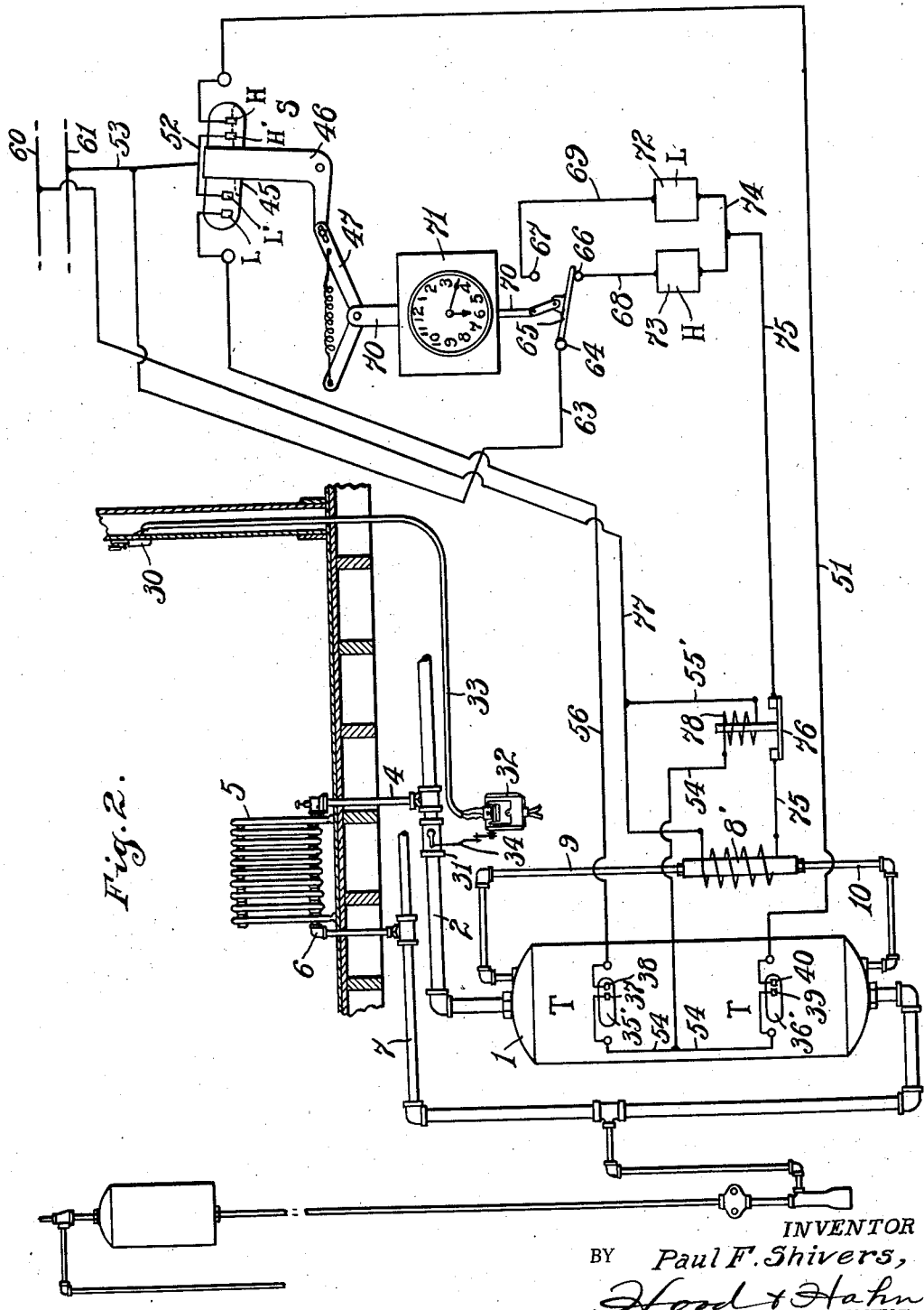

Patented Dec. 18, 1934

1,985,215

UNITED STATES PATENT OFFICE 1,985,215

APPARATUS FOR HEATING FLUID

Paul F. Shivers, Wabash, Ind., assignor to Minneapolis-Honeywell Regulator Company, Minneapolis, Minn., a corporation of Delaware Application March 31, 1930, Serial No. 440,599

8 Claims. (Cl. 237—2)

Many public utilities supplying gas or electric current for various purposes charge a lower cost-rate for service during certain periods of each twenty-four hours when the normal demand is low in order to stimulate consumption during the off-peak periods.

The object of my present invention is to provide a hot water heating system, particularly designed for house heating by gas or electric current, by means of which room heating may be effected during the major portion of the time by means of water which has been heated during the low cost rate periods.

In the accompanying drawings Fig. 1 illustrates diagrammatically an embodiment of my invention in a system, the water heating medium of which is to be gaseous fuel; and Fig. 2 is a view similar to Fig. 1 but showing an electric heater.

In the drawings 1 is a suitably heat insulated storage tank of sufficient capacity to contain a body of water sufficient in volume, when highly heated, and controllably circulated through the room-heating radiators, to sufficiently heat the rooms under normal conditions for a major portion of each twenty-four hours.

Leading from the top of tank 1 is a main delivery pipe 2 delivering to a series of pipes 4, each of which leads to a radiator 5, each radiator having a return pipe 6 delivering to a main return pipe 7 which leads into the bottom of tank 1. A high efficiency gas heater 8 is connected in the usual manner by pipes 9 and 10 with the interior of tank 1 so as to be capable of heating the contents of tank 1 to the desired temperature. Heater 8, in the illustrated embodiment is supplied with gas through a pipe 11 having a control valve 12 of well-known form therein, said valve being preferably of the electro-magnetic type.

Gas to pipe 11 is supplied by means of suitable piping connections through either a low-cost-rate meter 13 or a high-cost-rate meter 14. Meters 13 and 14 are supplied through pipes 13' and 14' respectively from a valve casing 15 which is connected to the main gas supply line or power line 16. Casing 15 is provided with a valve seat 17 through which gas may flow to pipe 13' and with a valve seat 18 through which gas may flow to pipe 14'; and arranged between the seats 17 and 18 is a valve 19 which may be seated alternately upon the seats 17 and 18 to control flow therethrough. Valve 19 is carried by a stem 20 controlled by a program clock 21, of well-known construction, the arrangement being such that, during given periods of each twenty-four hours, connection will be established between pipes 16 and 13' and during the remaining portion of each twenty-four hours connection will be established between pipe 16 and pipe 14'.

The time control valve unit just described will be enclosed within a locked casing 25 and accessible only to an authorized representative of the utility company whereby fuel for the heater 8 will be delivered through the low-cost-rate meter or the high-cost-rate meter, depending upon the authorized adjustments of the time train.

In order to automatically control the flow of hot water to the radiators in accordance with the temperature requirements of the space or spaces to be heated, I provide one or more room thermostats, 30, of well-known form, a corresponding number of valves 31 arranged between tank 1 and any desired grouping of radiators 5, and valve-actuating mechanism 32 under the control of each thermostat 30, the arrangement being such that valve 31 will be opened and closed in accordance with the temperature environment of the thermostat 30. The thermostat 30 in the diagram is indicated as of the electric terminal type connected by cable 33 with the actuator 32 which is of a well-known electric-motor type connected by connections 34 of well-known character with valve 31.

Efficient room heating can be attained with water at say somewhere between 100 to 140 degrees F., but in order to avoid the necessity of too large a storage tank 1 it is desirable to be able to carry the temperature of the water considerably higher when low-priced gas is available. It is also necessary to provide means for automatically starting the heater when the water temperature falls to an inefficient minimum say, 100 degrees F., and to stop the heater when the water temperature has risen to a desired maximum. In order to accomplish the desired results I provide two electric-terminal thermostatic elements T and T' of well-known form and known in the trade as aquastats, each comprising a bi-metallic thermostatic element (not shown) and, for instance, a mercury contact tube 35' or 36' respectively. Tube 35' comprises the two terminals 37 and 38 and the tube 36' comprises the two terminals 39 and 40.

Arranged adjacent the time-train 21 is a time-switch S comprising a mercury tube 45 having a pair of terminals L, L' and a pair of terminals H, H' at opposite ends of the tube. Tube 45 is carried by pivoted arm 46 connected by a snap-toggle 47 with stem 20 of valve 19, the arrangement being such that when valve 19 is in position to establish gas flow from pipe 16 through the high-cost-rate meter 14, terminals H, H' of tube 45 are active, and when valve 19 is in position to establish gas flow through the low-cost-rate meter 13, terminals L, L' are active.

Terminal 40 is connected by wire 51 with terminal H'. Terminals L' and H are connected by wire 52 and this wire is connected with one side of the supply line X. Terminals 37 and 39 are connected together and to one end of the coil 12' of valve 12 by the branched wire 54, and the other end of said coil is connected by wire 55 with the other side of the line X. Terminal 38 is connected by wire 56 with terminal L.

Aquastat T will be set so as to break the circuit at 37—38 when the water in tank 1 reaches the desired high maximum, say 205 degrees F. (or a temperature even above water boiling in case a pressure device is connected to the return pipe 7) and to make contact at 37—38 whenever the water temperature in tank 1 drops to the desired upper-range minimum, say 200 F. Aquastat T' will be set to break contact at 39—40 when the water in tank 1 reaches a desired lower-range maximum say 140 degrees F., and to make contact at 39—40 when the desired lower range minimum, say 100 F., is reached.

The operation is as follows: Assuming time-train 21 to have shifted valve 19 to establish gas flow through the low-cost-rate meter 13, tube 45 will be tilted so as to connect terminals L, L', whereupon aquastat T will be in command and terminals 37—38 will be connected if the temperature of the water in tank 1 is below the desired high maximum, thus establishing the circuit; line, 55, coil 12', 54, 37, 38, 56, L, L', 52, 53, line; thus opening the gas valve and permitting the gas heater to function until the temperature condition in tank 1 has been brought to the desired high maximum. Aquastat T will remain in command, automatically causing opening and closing of the gas valve in accordance with the temperature of the water in tank 1, until the time-train shifts valve 19 to stop gas flow through the low-cost-rate meter 13 and to establish gas flow through the high-cost-rate meter 14. When the train shifts the valve 19 to cause gas flow through the high-cost-rate meter 14, the aquastat T' will be in command and it will maintain disconnection between terminals 39—40 until the temperature of the water in tank 1 has dropped to the desired minimum, so that the gas valve 12 will remain closed until the heat which has been stored in the water in tank 1 has been exhausted to the desired minimum. If this exhaustion takes place before the time-train has advanced sufficiently to again shift valve 19, to the low-cost-rate position, the shifting of the aquastat T' to cause connection between terminals 39 and 40 will cause an opening of the gas valve through the circuit; line, 55, coil 12', 54, 39, 40, 51, H', H, 52, 53, line; and there will be a flow of gas through the high-cost-rate meter until the water tank 1 has been brought to the desired low maximum.

It will be seen therefore, that fuel consumption during the low-cost-rate period will be utilized to store up heat in the water of the system for extraction during a major portion, or perhaps all, of the high-cost-rate period and the gas consumption during the high-cost-rate period will be reduced to a minimum.

At all times the room thermostat 30 will cause automatic manipulation of the valve 31 to determine water flow from tank 1 through radiator 5 in accordance with the room temperature.

It will be readily understood that my invention is applicable to a hot water heating system wherein the heat is supplied by electric current, and such a system is illustrated in Fig. 2.

Those elements illustrated in the embodiment of Fig. 2 which are identical with elements illustrated in Fig. 1 are indicated by corresponding reference numerals. The only differences between the embodiment of Figs. 1 and 2 consist in the substitution of an electrical heater 8' for the gas heater 8, and electrically controlled elements and current controlling elements for gas controlled elements and gas flow controlling elements of Fig. 1.

In Fig. 2 the source of energy supply is indicated as line wires 60 and 61. The heater 8' is supplied with energy through a wire 63 connected to the wire 53 which, in turn, is connected to the line wire 61. The wire 63 leads to a terminal 64 of an oscillable switch arm 65, said arm being movable to establish contact alternatively with terminals 66 and 67 respectively connected, by wires 68 and 69, with a high-cost-rate electric meter 73 and a low-cost-rate electric meter 72. Said meters 72 and 73 are connected in parallel by a wire 74 to a wire 75 leading to one end of the heater 8', a switch 76 being interposed in said wire 75. The opposite end of the heating element 8' is connected by a wire 77 with the line wire 60.

The switch arm 65 is connected to be controlled by the plunger 70 which, in turn, is operated by the time train 71.

It will be seen that the switch 76 is analogous to the gas valve 12, and the switch 76 is normally held in position to close the circuit through the wire 75 by the action of a solenoid 78 which is normally energized through a circuit 60, 77, 55', 78, 54, and thence, alternatively, through T, 56, L, L', 52, 53, 61; or T', 51, H, H', 52, 53, 61. Of course, as in the embodiment illustrated in Fig. 1, the course of this circuit is dependent upon the position of the mercury tube switch 45, and said switch is positioned by actuation of the plunger 70.

When the parts are in the positions illustrated, current flow to the heater 8' follows the circuit 60, 77, 8', 75, 76, 74, 73, 68, 66, 65, 64, 63, 53, 61, whereby the high-cost-rate meter 73 is actuated. With the parts in the position illustrated the thermostat T' is in control of the solenoid 78 which dominates the switch 76 which, in turn, controls the heater circuit; the solenoid-energizing circuit following the course 60, 77, 55', 78, 54, T', 51, H, H', 52, 53, 61.

When the time train 71 shifts the switch arm 65 into contact with the terminal 67, the heater will be energized through the circuit 60, 77, 8', 75, 76, 74, 72, 69, 67, 65, 64, 63, 53, 61; and at that time, the heater circuit will be dominated by the thermostat T through the circuit 60, 77, 55', 78, 54, T, 56, L, L', 52, 53, 61.

Wherever the term "power line" is used in the appended claims, it is to be understood that the same applies not only to a gas pipe, but also to an electrical conductor or other conductor of energy. It will of course be understood that a heat-transferring circulating medium other than water may be used and the term "hot water" is intended to include such other medium.

I claim as my invention:

1. In combination, a tank for containing fluid, a heating element for such fluid, a power line, a low-cost-rate meter, a high-cost-rate meter, means for selectively connecting said power line to said meters, means responsive to temperature conditions in said tank for controlling flow from said low-cost-rate meter to said heating element, said means being actuable at predetermined high limiting temperatures, and means responsive to temperature conditions in said tank for controlling flow from said high-cost-rate meter to said heating element, said last-named means being actuable at predetermined low limiting temperatures.

2. In combination, a tank for containing fluid, a heating element for such fluid, a power line, a low-cost-rate meter, a high-cost-rate meter, time-controlled means for selectively connecting said power line to said meters, means responsive to temperature conditions in said tank for controlling flow from said low-cost-rate meter to said heating element, said means being actuable at predetermined high limiting temperatures, and means responsive to temperature conditions in said tank for controlling flow from said high-cost-rate meter to said heating element, said last-named means being actuable at predetermined low limiting temperatures.

3. In combination, a tank for containing fluid, a heating element for such fluid, a power line, a low-cost-rate meter, a high-cost-rate meter, high temperature thermo-responsive means in said tank and adapted to control flow from said low-cost rate meter to said heating element, low-temperature thermo-responsive means in said tank and adapted to control flow from said high-cost-rate meter to said heating element, and means for selectively connecting said respective meters to said power line, said last-mentioned means being operative to render said first-mentioned thermo-responsive means ineffective when said high-cost-rate meter is connected to said power line, and to render said second-mentioned thermo-responsive means ineffective when said low-cost-rate meter is connected to said power line.

4. Means for maintaining a supply of heated fluid comprising a storage tank, a heating element for said fluid, means for supplying high-priced energy to said heating element, means responsive to temperature conditions in said tank for controlling the supply of high-priced energy to said heating element, said last-mentioned means being operable to maintain the temperature of such fluid above a predetermined minimum and to prevent the flow of high-priced energy to said heating element to raise the temperature of said fluid above a predetermined maximum, means for supplying low-priced energy to said heating element, means responsive to temperature conditions in said tank for controlling the flow of low-priced energy to said heating element, said last-mentioned means being operable to permit the temperature of said fluid to be raised above said above-mentioned maximum, and means for selectively rendering said respective thermo-sensitive means effective to control energy flow to said heating element.

5. Means for maintaining a supply of heated fluid comprising a storage tank, a heating element for said fluid, means for supplying high-priced energy to said heating element, means responsive to temperature conditions in said tank for controlling the supply of high-priced energy to said heating element, said last-mentioned means being operable to maintain the temperature of such fluid above a predetermined minimum and to prevent the flow of high-priced energy to said heating element to raise the temperature of said fluid above a predetermined maximum, means for supplying low-priced energy to said heating element, means responsive to temperature conditions in said tank for controlling the flow of low-priced energy to said heating element, said last-mentioned means being operable to permit the temperature of said fluid to be raised above said above-mentioned maximum, and means for selectively connecting said heating elements to said high-priced and low-priced supplies and for simultaneously rendering the appropriate one of said thermo-sensitive means effective.

6. Means for maintaining a supply of heated fluid comprising a storage tank, a heating element for said fluid, means for supplying high-priced energy to said heating element, means responsive to temperature conditions in said tank for controlling the supply of high-priced energy to said heating element, said last-mentioned means being operable to maintain the temperature of such fluid above a predetermined minimum and to prevent the flow of high-priced energy to said heating element to raise the temperature of said fluid above a predetermined maximum, means for supplying low-priced energy to said heating element, means responsive to temperature conditions in said tank for controlling the flow of low-priced energy to said heating element, said last-mentioned means being operable to permit the temperature of said fluid to be raised above said above-mentioned maximum, and time-controlled means for selectively rendering said respective energy-supplying and thermo-sensitive controlling means effective.

7. In combination, a storage tank for containing a fluid, a heating element associated with said tank, a power line, and means for connecting said power line to said heating element, said means including a time-controlled element and being operable to supply energy to said heating element during off-peak power-demand periods to maintain the temperature of said fluid above a predetermined upper-range minimum, and to supply energy to said heating element, during peak power-demand periods, only while the temperature of said fluid is below a predetermined lower-range maximum.

8. In combination, a storage tank for containing a fluid, a heating element associated with said tank, a power line, and means for connecting said power line to said heating element, said means including a time-controlled element and being operable to supply energy to said heating element, during off-peak power-demand periods, to maintain the temperature of said fluid above a predetermined upper-range minimum, and to supply energy to said heating element, during peak power-demand periods, only while the temperature of said fluid is below a predetermined lower-range maximum, said lower-range maximum being below said predetermined upper-range minimum.

PAUL F. SHIVERS.